(12) United States Patent
Clements et al.

(10) Patent No.: US 12,710,767 B2
(45) Date of Patent: Aug. 18, 2026

(54) GUIDANCE METHOD AND SYSTEM

(71) Applicant: Raytheon Systems Limited, Harlow (GB)

(72) Inventors: Aidan Ronald Clements, Harlow (GB); Jonathan Andrew Blenkharn, Harlow (GB)

(73) Assignee: Raytheon Systems Limited, Harlow (GB)

( * ) Notice: Subject to any disclaimer, the term of this patent is extended or adjusted under 35 U.S.C. 154(b) by 297 days.

(21) Appl. No.: 18/541,258

(22) Filed: Dec. 15, 2023

(65) Prior Publication Data

US 2024/0345601 A1 Oct. 17, 2024

(30) Foreign Application Priority Data

Dec. 16, 2022 (GB) ..................................... 2219075

(51) Int. Cl.

*G05D 1/683* (2024.01)
*G05D 1/461* (2024.01)
*G05D 105/35* (2024.01)
*G05D 109/20* (2024.01)

(52) U.S. Cl.

CPC ............. *G05D 1/683* (2024.01); *G05D 1/461* (2024.01); *G05D 2105/35* (2024.01); *G05D 2109/285* (2024.01)

(58) Field of Classification Search

None

See application file for complete search history.

(56) References Cited

U.S. PATENT DOCUMENTS 5,522,567 A * 6/1996 Kinstler ................. G05D 1/106 244/3.15
6,676,071 B1 * 1/2004 Phillips .................... G05D 1/12 701/1

FOREIGN PATENT DOCUMENTS

GB 1294291 A 10/1972

OTHER PUBLICATIONS

K. S. Erer and R. Tekin, "Three-Dimensional Impact-Angle Control with Biased Proportional Navigation," 2022 30th Mediterranean Conference on Control and Automation (MED), Vouliagmeni, Greece, 2022, pp. 409-413, doi: 10.1109/MED54222.2022.9837204. (Year: 2022).*

I. Papp et al., "Derivation of the Fundamental Missile Guidance Equations"; "Academic and Applied Research in Military and Public Management Science" journal; vol. 14, issue 4; year 2015; Budapest, Hungary; pp. 341-348. (Year: 2015).*

R. Livermore et al., "Deviated Pure-Pursuit-Based Optimal Guidance Law for Imposing Intercept Time and Angle"; "Journal of Guidance, Control, and Dynamics"; vol. 41, No. 8; Aug. 2018; Reston, VA, USA. (Year: 2018).*

(Continued)

*Primary Examiner* — Bernarr E Gregory

(57) ABSTRACT

A method for guiding a weapon to a target, the method comprising: obtaining a required impact vector for the weapon at the target, obtaining a line of sight (LOS) vector from the weapon to the target; determining a velocity vector of the weapon; defining a guidance plane, the guidance plane being a plane in which both the impact vector and the LOS vector lie; generating guidance commands for the weapon to place the velocity vector of the weapon in the guidance plane with a velocity perpendicular to the guidance plane of zero.

20 Claims, 9 Drawing Sheets

(56) References Cited

OTHER PUBLICATIONS

Office Action dated Jan. 22, 2025 in connection with European Patent Application No. 23214377.6, 6 pages.
Partial European Search Report dated Apr. 29, 2024 in connection with European Patent Application No. 23214377.6, 10 pages.
Tekin, "Augmented Plane Pursuit for Impact-Angle Control in Three Dimensions", Journal of Guidance, Control and Dynamics., vol. 45, No. 9, Sep. 2022, 7 pages.
Zhang et al., "Optimal guidance law design for impact with terminal angle of attack constraint", Optik, vol. 125, Issue 1, Jun. 2013, 9 pages.
Gaudet et al., "Line of Sight Curvature for Missile Guidance using Reinforcement Meta-Learning", Jan. 2023, 14 pages.
Ratnoo, "Engineering Notes: Analysis of Two-Stage Proportional Navigation with Heading Constraints," Journal of Guidance, Control, and Dynamics, vol. 39, No. 1, Jan. 2016, 9 pages.
Kelley et al., "Boost-Glide Range Optimal Guidance," Optimal Control Applications Methods, vol. 3, 1982, 6 pages.
Kim et al., "Engineering Notes: Bias-Shaping Method for Biased Proportional Navigation with Terminal-Angle Constraint," Journal of Guidance, Control, and Dynamics, vol. 36, No. 6, Nov.-Dec. 2013, 6 pages.
Combined Search and Examination Report under Sections 17 & 18(3) in GB Application No. GB2219075.5 dated Jun. 9, 2023, 2 pages.

* cited by examiner

GUIDANCE METHOD AND SYSTEM

CROSS REFERENCE TO RELATED APPLICATION

This application claims priority to United Kingdom Patent Application No. 2219075.5 filed on Dec. 16, 2022, the disclosure of which is incorporated herein by reference in its entirety.

FIELD OF THE INVENTION

The present application relates to a method and system for guidance of airborne vehicles, and in particular for guidance of glide weapons.

BACKGROUND TO THE INVENTION

In many applications of airborne weapons it is desirable for the weapon to be guided to impact a target from a specific direction in three dimensions, that is, from a specific angle in azimuth and a specific angle in elevation.

Current constrained guidance solutions to guide an airborne weapon to impact a target from a specific direction in three dimensions do not take any account of energy usage required to achieve impact from the desired direction, so that these guidance solutions have the problem that they are generally very wasteful of the energy used to propel the airborne weapon, and so reduce the possible range of the weapon. This reduction in range may be a relatively small proportion of the maximum range for fully powered airborne weapons, such rocket propelled missiles or other powered aerial vehicles, which are able to use energy from their propulsion system to manoeuvre the weapon into the desired approach vector. However, for glide weapons, which rely on kinetic and geopotential energy to power their movement, the energy used in maneuvering the weapon to achieve the desired impact direction can significantly reduce the range of the weapon.

The inventors have devised the claimed invention in light of the above considerations. The embodiments described below are not limited to implementations which solve any or all of the disadvantages of the known approaches described above.

SUMMARY OF INVENTION

This Summary is provided to introduce a selection of concepts in a simplified form that are further described below in the Detailed Description. This Summary is not intended to identify key features or essential features of the claimed subject matter; variants and alternative features which facilitate the working of the invention and/or serve to achieve a substantially similar technical effect should be considered as falling into the scope of the invention.

The invention is defined as set out in the appended set of claims.

In a first aspect of the present invention, there is provided a method for guiding a weapon to a target, the method comprising: obtaining a required impact vector for the weapon at the target; obtaining a line of sight (LOS) vector from the weapon to the target; determining a velocity vector of the weapon; defining a guidance plane, the guidance plane being a plane in which both the impact vector and the LOS vector lie; and generating guidance commands for the weapon to place the velocity vector of the weapon in the guidance plane with a velocity perpendicular to the guidance plane of zero.

In some embodiments, further comprising: calculating an optimum flight path angle in the vertical plane; determining a flight path at the optimum flight path angle which lies in the guidance plane with a velocity perpendicular to the guidance plane of zero; wherein the generating the guidance commands comprises generating guidance commands to make the velocity vector of the weapon the determined flight path.

In some embodiments, the optimum flight path angle maximises gliding range

In some embodiments, the optimum flight path angle maintains the dynamic pressure of the weapon at an optimum value.

In some embodiments, further comprising: using a proportional navigation guidance law in the guidance plane to guide the weapon to the target.

In some embodiments, the proportional navigation guidance law: determines a rate of change of angle of the LOS vector; and uses the determined rate of change to determine a required rate of change of angle of a velocity component parallel to the guidance plane of the velocity vector; and the method further comprises: determining a velocity component perpendicular to the guidance plane of the velocity vector; wherein the generating the guidance commands comprises generating guidance commands to change the angle of the velocity component parallel to the guidance plane of the velocity vector at the determined required rate of change and to reduce the velocity component perpendicular to the guidance plane of the velocity vector to zero.

In some embodiments, the method is iteratively repeated.

In some embodiments, the weapon is a glide weapon.

In a second aspect of the present invention, there is provided a method for guiding a weapon to a target, the method comprising: i) obtaining a required impact vector for the weapon at the target; ii) obtaining a line of sight (LOS) vector from the weapon to the target; iii) determining a velocity vector of the weapon; iv) defining a guidance plane, the guidance plane being a plane in which both the impact vector and the LOS vector lie; v) determining whether the weapon can impact the target with the required impact vector by following a proportional navigation guidance law with a navigation gain having a value within a predetermined range having a maximum navigation gain value and a minimum navigation gain value; and if it is determined that the weapon cannot impact the target with the required impact vector by following the proportional navigation guidance law with a navigation gain having a value within the predetermined range because achieving the required impact vector would require a lower navigation gain value than the minimum navigation gain value: vi) calculating an optimum flight path angle in the vertical plane; vii) determining a flight path at the optimum flight path angle which lies in the guidance plane with a velocity perpendicular to the guidance plane of zero; and viii) generating guidance commands for the weapon to make the velocity vector of the weapon the determined flight path; and returning to i); if it is determined that the weapon can impact the target with the required impact vector by following the proportional navigation guidance law with a navigation gain having a value within the predetermined range; x) obtaining a line of sight (LOS) vector from the weapon to the target; xi) determining a velocity vector of the weapon; xii) defining a guidance plane, the guidance plane being a plane in which both the impact vector and the LOS vector lie; xiii) determining a navigation gain value required to impact the target with the required impact vector by following the proportional navigation guidance law in the guidance plane with that navigation gain value; xiv) using a proportional navigation guidance law in the guidance plane to guide the weapon to the target, wherein the proportional navigation guidance law: determines a rate of change of angle of the LOS vector; and uses the determined rate of change and the determined navigation gain value to determine a required rate of change of angle of a velocity component parallel to the guidance plane of the velocity vector; and the method further comprising: xv) determining a velocity component perpendicular to the guidance plane of the velocity vector; and xvi) generating guidance commands to change the angle of the velocity component parallel to the guidance plane of the velocity vector at the determined required rate of change and to reduce the velocity component perpendicular to the guidance plane of the velocity vector to zero; and repeating from x) until the weapon reaches the target.

In some embodiments, further comprising: if it is determined that the weapon cannot impact the target with the required impact vector by following the proportional navigation guidance law with a navigation gain having a value within the predetermined range because achieving the required impact vector would require a higher navigation gain value than the maximum navigation gain value; xvii) calculating a flight path angle in the vertical plane which corresponds to the application of a constant downward acceleration to the glide weapon; xviii) determining a flight path at the flight path angle which lies in the guidance plane with a velocity perpendicular to the guidance plane of zero; and xix) generating guidance commands for the weapon to make the velocity vector of the weapon the determined flight path; and xx) returning to i).

In some embodiments, further comprising: if it is determined that the weapon cannot impact the target with the required impact vector by following the proportional navigation guidance law with a navigation gain having a value within the predetermined range because achieving the required impact vector would require a higher navigation gain value than the maximum navigation gain value; xxi) calculating a flight path angle in the vertical plane which corresponds to the application of a constant downward acceleration to the glide weapon; xxii) generating guidance commands for the weapon to make the velocity vector of the weapon have the determined flight path angle; and xxiii) returning to i).

In some embodiments, the optimum flight path angle maximises gliding range.

In some embodiments, the optimum flight path angle maintains the dynamic pressure of the weapon at an optimum value.

In some embodiments, the weapon is a glide weapon.

In some embodiments, v) comprises: determining a first impact angle which can be achieved by the weapon by following a proportional navigation guidance law with the maximum navigation gain value; determining a second impact angle which can be achieved by the weapon by following a proportional navigation guidance law with the minimum navigation gain value; and comparing the determined first and second impact angles to the required impact vector.

In some embodiments, it is determined that the weapon can impact the target with the required impact vector by following the proportional navigation guidance law with a navigation gain having a value within the predetermined range if the required impact vector is between or equal to the first and second impact angles.

In some embodiments, it is determined that the weapon cannot impact the target with the required impact vector by following the proportional navigation guidance law with a navigation gain having a value within the predetermined range because achieving the required impact vector would require a higher navigation gain value than the maximum navigation gain value if the impact vector is outside the first and second impact angles, and the first impact angle is located between the second impact angle and the impact vector.

In some embodiments, it is determined that the weapon cannot impact the target with the required impact vector by following the proportional navigation guidance law with a navigation gain having a value within the predetermined range because achieving the required impact vector would require a lower navigation gain value than the maximum navigation gain value if the impact vector is outside the first and second impact angles, and the second impact angle is located between the first impact angle and the impact vector.

In a third aspect of the present invention, there is provided a weapon arranged to carry out the method according to the first aspect, or the second aspect.

In a fourth aspect of the present invention, there is provided a controller for a weapon arranged to carry out the method according to the first aspect, or the second aspect.

In a fifth aspect of the present invention, there is provided a computer-readable medium comprising instructions which, when executed by a computer cause the computer to carry out the method of the first aspect, or the second aspect.

The features and embodiments discussed above may be combined as appropriate, as would be apparent to a person skilled in the art, and may be combined with any of the aspects of the invention except where it is expressly provided that such a combination is not possible or the person skilled in the art would understand that such a combination is self-evidently not possible.

BRIEF DESCRIPTION OF THE DRAWINGS

Embodiments of the present invention are described below, by way of example, with reference to the following drawings.

FIG. 5;

Figure 1:
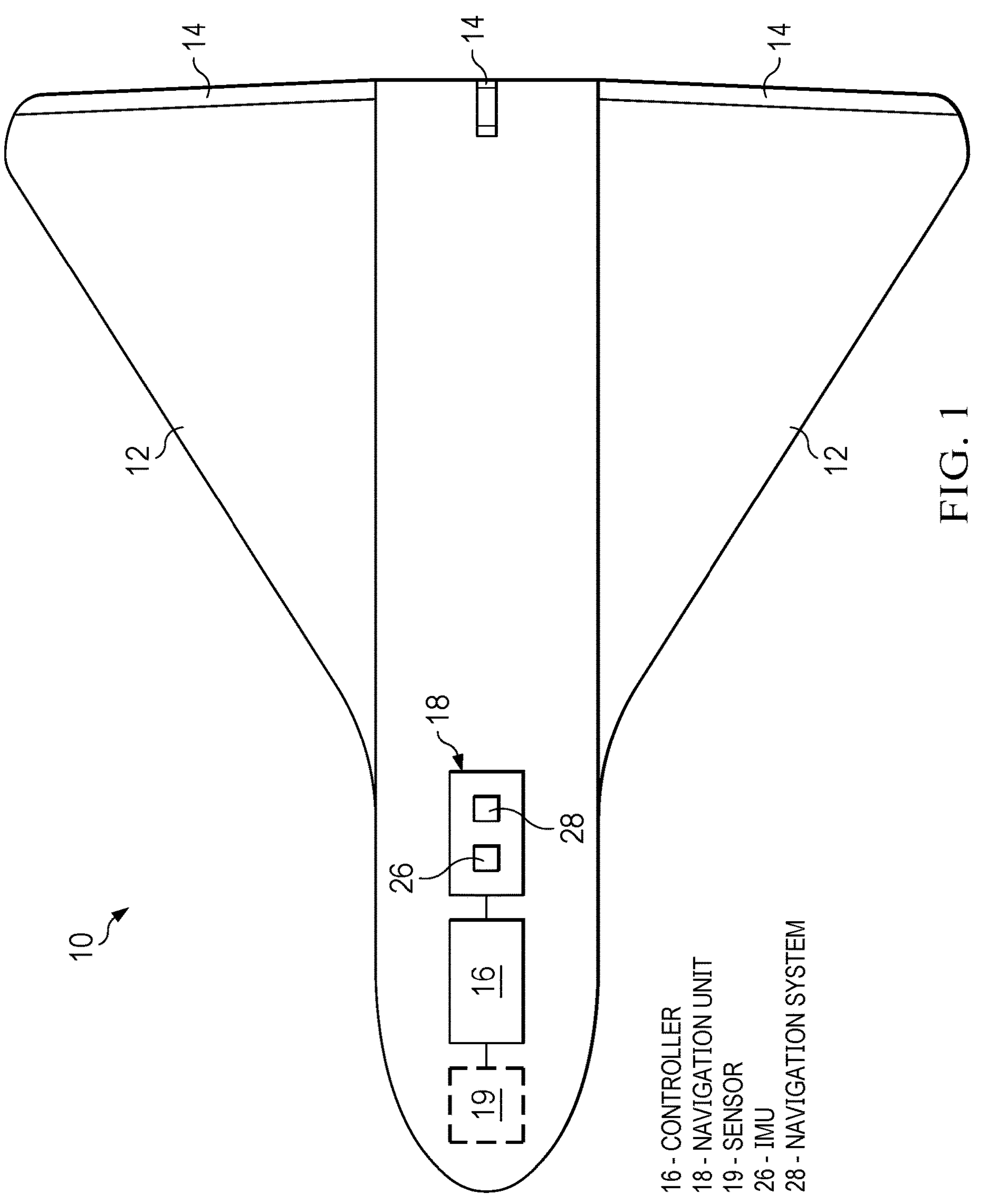
FIG. 1 shows a schematic diagram of a glide weapon according to a first embodiment.

Common reference numerals are used throughout the figures to indicate the same or similar features.

DETAILED DESCRIPTION

Embodiments of the present invention are described below by way of example only. These examples represent the best mode of putting the invention into practice that are currently known to the Applicant although they are not the only ways in which this could be achieved. the description sets forth the functions of the example and the sequence of steps for constructing and operating the example. However, the same or equivalent functions and sequences may be accomplished by different examples.

FIG. 1 shows a schematic diagram of a glide weapon 10 according to a first embodiment. The glide weapon 10 comprises one or more aerodynamic surfaces 12 arranged to generate aerodynamic lift as the glide weapon 10 moves through the air, and one more control surfaces 14 able to operate to control the direction of movement of the glide weapon 10, typically by interacting with the air flow past the glide weapon 10 to generate forces on the guide weapon 10. The glide weapon 10 further comprises a controller 16 and a navigation system 18. The controller 16 is arranged to control the operation of the control surfaces 14, and so control the path of the glide weapon 10. The navigation unit 18 is arranged to determine the position, attitude and velocity of the glide weapon 10 and to provide this position to the controller 16. The position of the glide weapon 10 is the three-dimensional (3D) position of the glide weapon. In the illustrated embodiment, the 3D position of the glide weapon 10 is defined in terms of the geographical, two dimensional, location vertically below the glide weapon 10 and the height or altitude of the glide weapon 10. However, this is not essential and some examples may use different frames of reference. The velocity of the glide weapon 10 is a vector comprising both the direction and speed of movement of the glide weapon. In the illustrated example of FIG. 1 the glide weapon 10 has separate aerodynamic surfaces 12 and control surfaces 14. This is not essential. In some examples the glide weapon 10 may comprise combined surfaces providing both aerodynamic lift and directional control.

Figure 2:
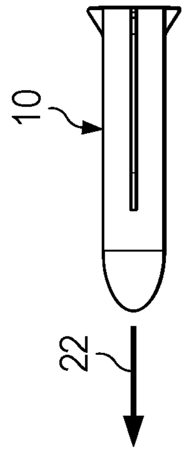
FIG. 2 shows an explanatory diagram of schematic of operation of the glide weapon of FIG. 1.
Figure 2:
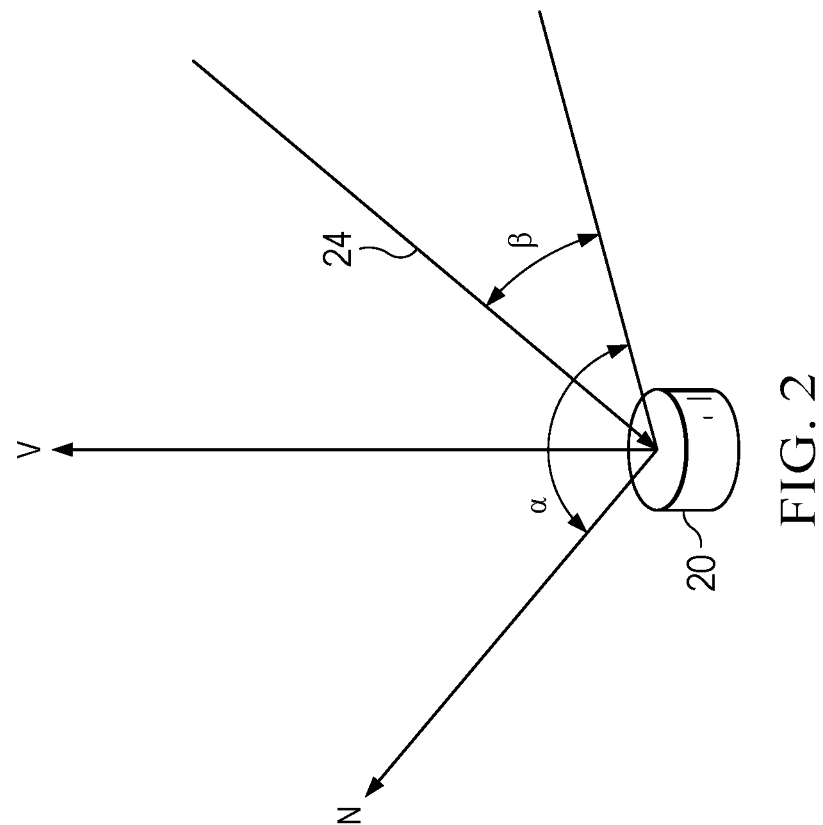

FIG. 2 shows an explanatory diagram of the glide weapon 10 of the first embodiment traveling towards a target 20. The glide weapon 10 is moving with a velocity vector 22, and is intended to impact the target 20 at a predetermined azimuthal impact angle $\alpha$ and a predetermined elevation impact angle $\beta$. The azimuthal impact angle $\alpha$ and the elevation impact angle $\beta$ are separate and independent impact constraints which should both be satisfied in order to maximise the effectiveness of the glide weapon 10. The predetermined azimuthal impact angle $\alpha$ and the predetermined elevation impact angle $\beta$ define a predetermined three dimensional (3D) impact vector 24 passing through the target 20 and having the angles $\alpha$ and $\beta$ in azimuth and elevation respectively. In the illustrated example the target 20 is located on the surface of the earth and the azimuth angle $\alpha$ is the angle relative to North N about a vertical axis V and the elevation angle $\beta$ is relative to the horizontal plane of the surface of the earth perpendicular to the vertical axis V. This standard frame of reference is used to improve clarity. However, other suitable frames of reference may be used to define the impact vector 24.

In some examples, the glide weapon 10 may be completely unpowered and travel to the target 20 entirely by gliding using kinetic energy and geopotential energy. Geopotential energy may alternatively be referred to as gravitational potential energy. Such an unpowered glide weapon 10 may be dropped or released from another aerial vehicle, such as a manned aircraft or an unmanned aerial vehicle (UAV) or drone, and glide to the target 20. In other examples, the glide weapon 10 may be powered for a part of its flight, but otherwise be unpowered. For example, the glide weapon 10 may be powered on launch to a desired speed and altitude, for example by a rocket booster motor, which may be discarded after use, and then glide to the target 20 using kinetic energy and geopotential energy. Accordingly, although the weapon 10 is referred to as a glide weapon herein for clarity, as the present disclosure relates to methods of operating the weapon 10 during a terminal gliding phase of operation, the weapon 10 may not be a glide weapon at other times in its operation, and so may be referred to as a weapon, and not only as a glide weapon.

The navigation unit 18 is arranged to determine the position, orientation and velocity of the glide weapon 10. In the illustrated embodiment the navigation unit 18 comprises an inertial measurement unit (IMU) 26 and a satellite navigation system 28, which cooperate to determine the position, orientation, and velocity (that is, speed and direction of movement) of the glide weapon 10 in all six axes (in three perpendicular linear axes and about three perpendicular rotational axes). In the illustrated embodiment the navigation unit 18 uses position information from the IMU 26 and the satellite navigation system 28 to generate periodic estimates of the position, orientation, and velocity of the glide weapon 10, and provides these to the controller 16.

The satellite navigation system 28 may, for example, be a Global Positioning System (GPS). However, this is not essential, and other satellite navigation systems may be used. Navigation systems able to determine the position, orientation and velocity of a moving vehicle in all six axes, IMUs, and satellite navigation systems, and their operation, are well known to the skilled person in this technical field. Accordingly, the operation of the navigation unit 18 will not be discussed in detail herein.

The position of the target 20 and the desired predetermined impact vector 24 are stored in the controller 16. In some examples the position of the target 20 and the desired impact vector 24 are provided to the glide weapon 10 for storage in a memory component of, or associated with, the controller 16 before launch. In some examples the position of the target 20 and the desired impact vector 24 may be provided to the glide weapon 10, or updated, after launch, while the glide weapon 10 is in flight, either for the first time, or to replace an existing stored position and impact vector. In some examples the position of the target 20 and the desired impact vector 24 may be determined by the weapon itself during the mission.

In operation of the glide weapon 10, the controller 16 compares the stored position of the target 20 and the current position of the glide weapon 10 provided by the navigation unit 18, and determines a three dimensional (3D) line of sight (LOS) vector 30 from the glide weapon 10 to the target 20. Determining a line of sight between two known positions is a straightforward geometric calculation, and any suitable method may be used to do this. It will be understood that the line of sight vector 30 will vary as the glide weapon 10 moves relative to the target 20. As is explained above, in the illustrated embodiment of FIGS. 1 and 2 the navigation unit 18 provides periodic estimates of the position of the glide weapon 10 to the controller 16. In this embodiment the controller 16 determines a current line of sight vector 30 from the glide weapon 10 to the target 20 based on each position estimate it receives from the navigation unit 18, although this is not essential.

Figure 3:
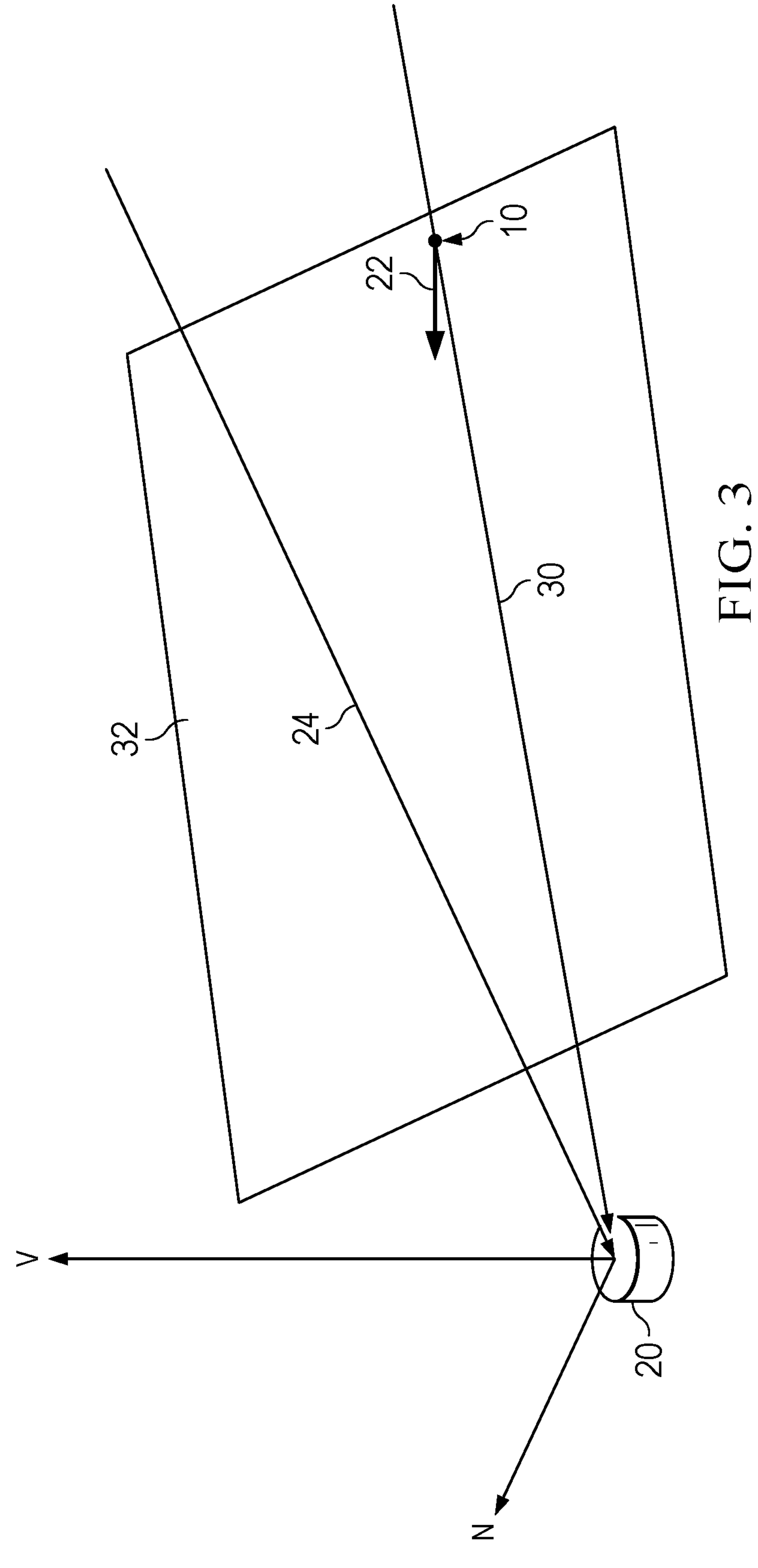
FIG. 3 is an explanatory diagram of principles used during operation of the glide weapon of FIG. 1.

FIG. 3 is an explanatory diagram illustrating how the controller 16 can guide the glide weapon 10 to impact the target 20 at the desired predetermined impact vector 24.

As is explained above, the position of the target 20 and the desired predetermined impact vector 24 are stored in the controller 16. Further, as is explained above, the controller 16 determines a line of sight vector 30 from the glide weapon 10 to the target 20. The controller 16 uses the line of sight vector 30 and the impact vector 24 to define a guidance plane 32. The guidance plane 32 is the two-dimensional (2D) plane in which both the impact vector 24 and the line of sight vector 30 lie. It will be understood that, for geometric reasons, because the impact vector 24 and the line of sight vector 30 are both straight lines which pass through the target 20 there will be one, and only one, such guidance plane 32, except in the special situation where the impact vector 24 and the LOS vector 30 are co-linear. In the illustrated example, when the impact vector 24 and the LOS vector 30 are co-linear the guidance plane 32 is defined as being the vertical plane in which both the impact vector 24 and the line of sight vector 30 lie. This is not essential, and alternative examples could select as the guidance plane another plane in which both the impact vector 24 and the line of sight vector 30 lie.

According to a first example, an overview of the operation of the glide weapon 10 is that, after defining the guidance plane 32, the controller 16 then determines a required direction of movement of the glide weapon 10 in the guidance plane 32 which will bring the glide weapon 10 towards the position of the target 20 with a flight path geometry which enables impact with the target at the impact angle in the guidance plane 32. The controller 16 then determines the changes of direction required to change a current movement vector 22 of the glide weapon 10 to a new movement vector 22 which lies in the guidance plane 32 and is parallel to the determined required direction of movement, so that the new movement vector 22 of the glide weapon 10 will be in or along the guidance plane 32 with a velocity perpendicular to the guidance plane 32 of zero. The controller 16 then commands the necessary movements of the control surfaces 14 to make these required changes of direction to direct the movement of the glide weapon 10 along the new movement vector 22 which lies in or along the guidance plane 32.

It will be understood that as the glide weapon 10 moves and the position of the glide weapon 10 changes relative to the target 20, the line of sight vector 30 will generally change, so that the position and orientation of the guidance plane 32 will change over time. Accordingly, the controller 16 redefines the guidance plane 32 and redetermines the required changes of direction required to the movement vector 22 at intervals as the glide weapon 10 is guided towards the target 20. Conveniently, in the illustrated embodiment, the controller 16 redefines the guidance plane 32 and redetermines the required changes of direction required to the movement vector 22 in response to each estimate of the position, attitude and velocity of the glide weapon 10 provided by the navigation system 18, although this is not essential.

The defining of the guidance plane 32 and constraining the movement of the glide weapon 10 lie in the guidance plane 32, with a velocity perpendicular to the guidance plane 32 of zero, couples together the otherwise independent constraints of the azimuthal impact angle $\alpha$ and the elevation impact angle $\beta$ comprised in the impact vector 24 and ensures that the movement of the glide weapon 20 achieves the desired impact vector 24 at both the azimuthal impact angle $\alpha$ and the elevation impact angle $\beta$ in an energy efficient manner. This improved energy efficiency may enable the glide weapon 10 to impact the target 20 with the desired impact vector 24 at a greater range than would otherwise be achievable from a particular starting condition, for example from a specific range and height having specific amounts of kinetic and geopotential energy. By way of comparison, if the glide weapon 10 were instead to be guided to impact a target along a desired impact vector by initially maneuvering the glide weapon 10 to a desired azimuthal angle $\alpha$ or bearing relative to the target, and then directing the guide weapon 10 along this bearing to impact the target from the desired elevation angle 3, the glide weapon 10 would use its available energy less efficiently and so would only be able to reach a target located at a shorter range from the start point from which the glide weapon begins gliding, for the same starting conditions. In other words, a glide weapon 10 operating in this way would use more of its finite available energy on maneuvering and changing direction, and so would have less energy available for moving to a greater range. The start point may, for example, be the release point of the glide weapon from another aerial vehicle.

Figure 4:
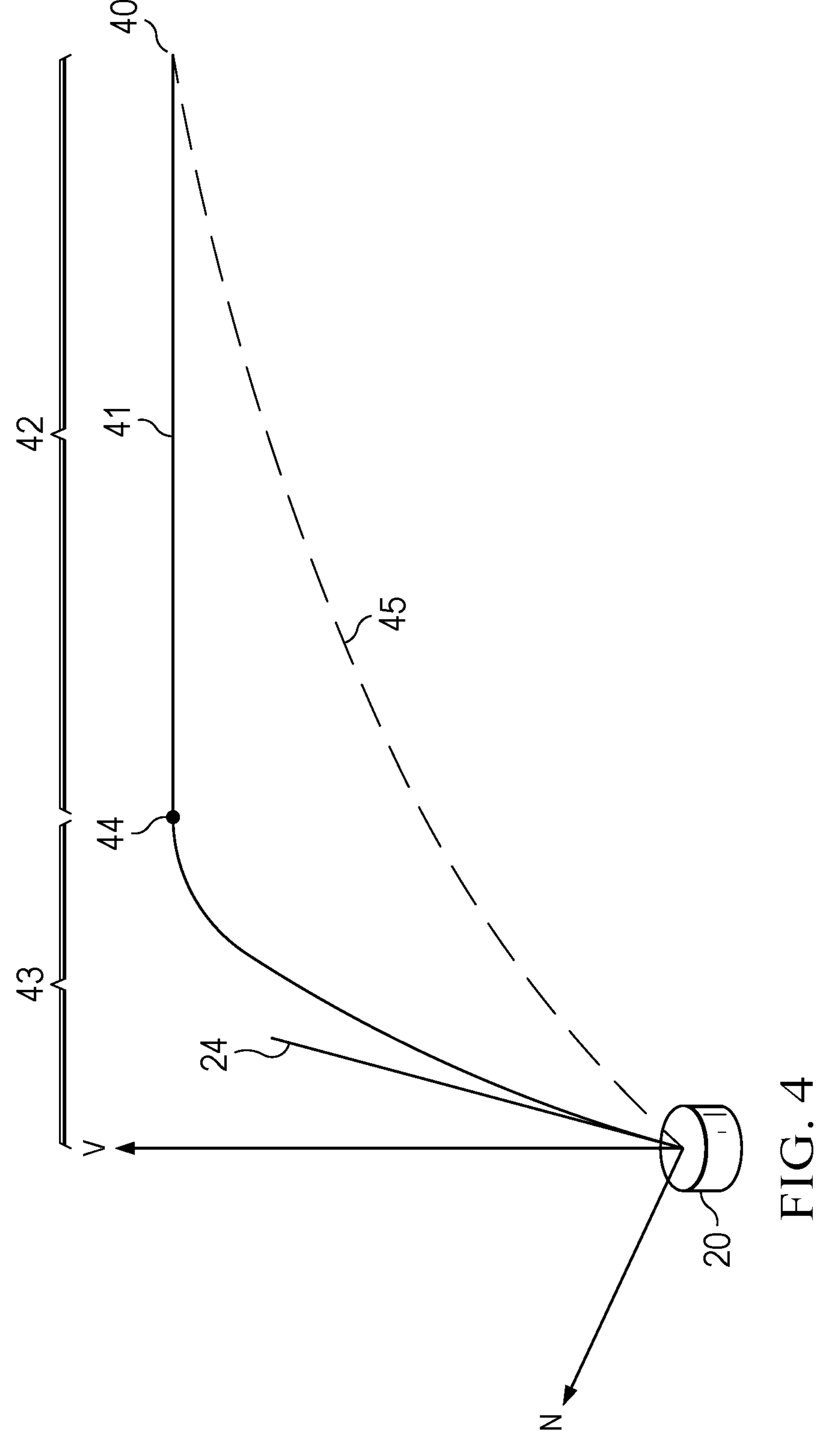
FIG. 4 is an explanatory diagram of the general operation of the glide weapon of FIG. 1.

FIG. 4 shows a further explanatory diagram of an example of operation of the glide weapon 10 according to the first embodiment.

As shown in FIG. 4, the glide weapon 10 moves from an initial point 40 to the target 20 along a path 41, and impacts the target 20 along the predetermined 3D impact vector 24. In the illustrated example the initial point 40 is the release point where the glide weapon 10 is dropped or released from another aerial vehicle. The illustrated example of FIG. 4 shows the operation of the glide weapon 10 starting from an initial point 40 where the impact vector 24 is at too high an angle relative to the horizontal to be achieved. The controller 16 operates to guide the glide weapon 10 along the path 41 to the target 20 using a guidance process. In the illustrated embodiment of FIG. 4, the guidance process has two different stages. In a first stage 42, the controller 16 guides the glide weapon 10 towards the target 20 in a range maximising manner, which to maintain the altitude of the glide weapon 10, so far as possible. Then, in a second, terminal, stage 43, the controller 16 guides the glide weapon 10 towards the target 20 using a proportional navigation guidance law to impact the target 20 along the predetermined 3D impact vector 24. The controller 16 controls the glide weapon 10 to manoeuvre within the guidance plane 32 as described above throughout the travel of the glide weapon 10, in both the first and second stages 42 and 43. The change over from the first stage 42 to the second stage 43, at point 44, is carried out when the controller 16 determines that it is possible for the glide weapon 10 to achieve impact at the target 20 along the predetermined 3D impact vector 24 by using a proportional navigation guidance law with a navigation gain within a predetermined range, as will be explained in more detail below. FIG. 4 shows an example, and in other examples the guidance process may have different stages and/or numbers of stages, as will be explained below.

Figure 5:
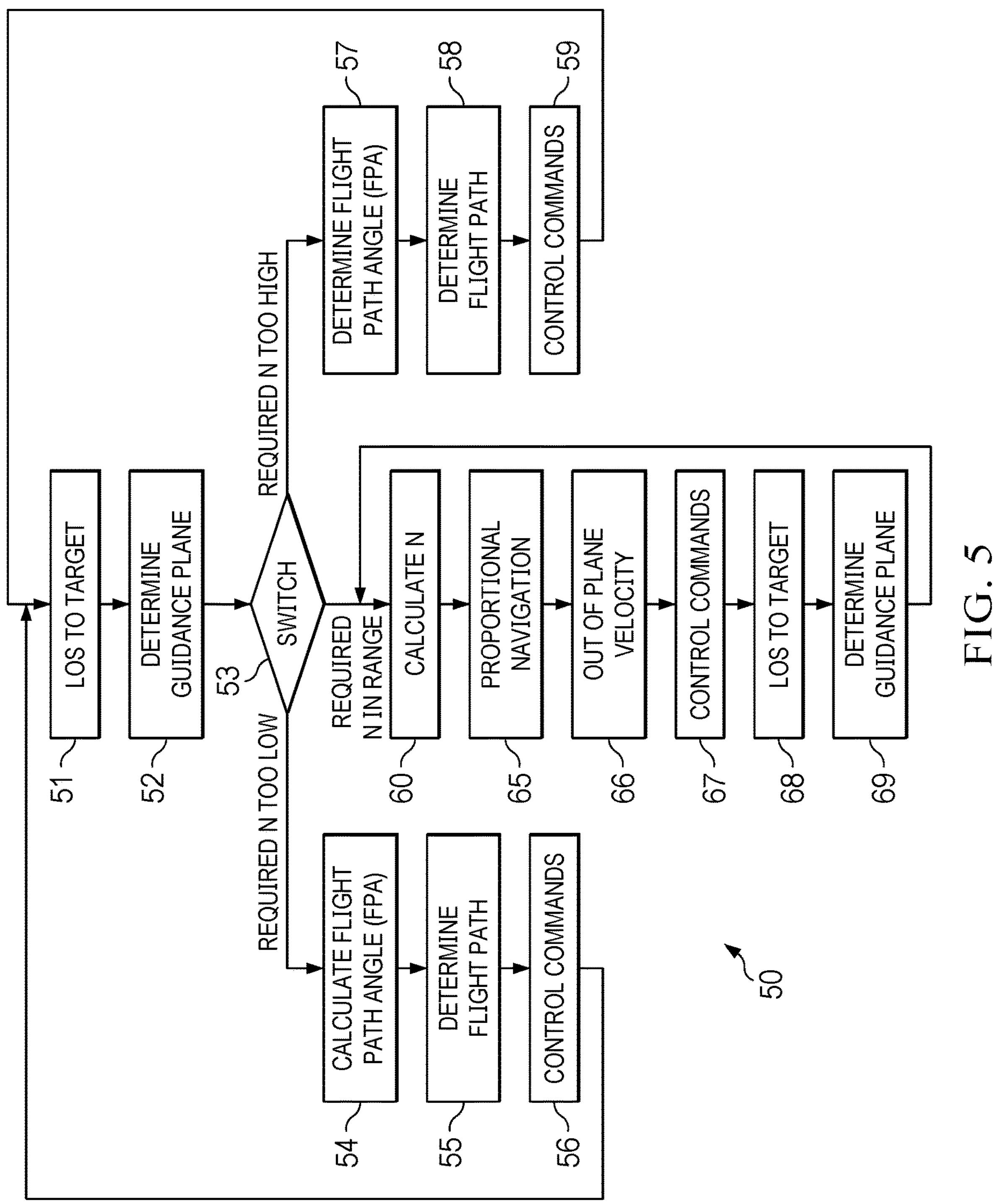
FIG. 5 is a flow chart of a guidance method used during operation of the glide weapon of FIG. 1.

FIG. 5 shows a flow chart of a guidance method 50 used by the controller 16 of the glide weapon 10. It will be understood that, although the blocks of the method 50 are shown as being carried out in a specific order, some of the blocks may be carried out in a different order, or simultaneously.

The method 50 starts when the glide weapon 10 is released at the release point 40. The method 50 begins with a line of sight (LOS) block 51. As will be explained below, the method 50 may sometimes operate iteratively, returning to the LOS block 51 in each iteration. In the LOS block 51, the controller 16 determines the 3D line of sight (LOS) vector 30 from the glide weapon 10 to the target 20. As is explained above, the controller 16 determines the LOS vector 30 using the stored position of the target 20 and the current position and orientation of the glide weapon 10 provided by the navigation unit 18 using three dimensional geometric calculations. Suitable methods of carrying out such geometric calculations are well known to the skilled person, so these do not need to be explained in detail herein. In some examples, the execution of the LOS block 51 by the controller 16 may be delayed until a "new" current position and orientation of the glide weapon 10 (that is, one not already used in a previous iteration of the LOS block 51) is provided by the navigation unit 18.

Then, in a guidance plane block 52, the controller 16 uses the determined LOS vector 30 and the stored desired impact vector 24 to define the guidance plane 32. As is explained above, the guidance plane 32 is the two-dimensional (2D) plane in which both the impact vector 24 and the line of sight vector 30 lie. Further, in this example, if the impact vector 24 and the line of sight vector 30 are collinear, the guidance plane 32 is the vertical two-dimensional (2D) plane in which both the impact vector 24 and the line of sight vector 30 lie. In other examples, it may be possible to use previous guidance command outputs in this case where line of sight and Impact vector are co-linear, or use no commands if no previous outputs exist, as this will be a singular case which will pass in time.

When the guidance plane 32 has been defined, in a switch block 53, the controller 16 determines whether, from its current position, attitude and velocity, the glide weapon 10 can achieve impact at the target 20 along the predetermined 3D impact vector 24, or whether the impact vector 24 is at too high an angle relative to the line of sight (LOS) vector 30 to be achieved, or whether the impact vector 24 is at too low an angle relative to the line of sight (LOS) vector 30 to be achieved (the angle of the 3D impact vector being the angle in the guidance plane). It will be understood that because the impact vector 24 lies in the guidance plane 32 the impact vector 24 can be defined as a single angle in the guidance plane 24. The methods used to make the determination in the switch block 53 will be explained in detail below. Commonly, in the situation where the glide weapon 10 has an attitude and velocity directed towards the target 20, the impact vector 24 being at too low an angle to be achieved may correspond to the 3D position of the glide weapon 10 being at too great an altitude, or being too close to the target 20, to achieve impact with the target 20 at the impact vector 24 with the guidance method used by the glide weapon 10, while the impact vector 24 being at too high an angle to be achieved may correspond to the 3D position of the glide weapon 10 being at too low an altitude, or being too far from the target 20, to achieve impact with the target 20 at the impact vector 24 with the guidance method used by the glide weapon 10. Other combinations of position, attitude and velocity may also result in the impact vector 24 being at too low or too high an angle, depending on the specific flight characteristics of the glide weapon 10 in any particular implementation.

In the illustrated embodiment of FIG. 5, the controller 16 is intended to guide the glide weapon 10 to impact the target 20 along the impact vector 24 using a proportional navigation guidance law having a navigation gain N within a predetermined range having a maximum value $N_{max}$ and a minimum value $N_{min}$ for at least a final or terminal part of the movement of the glide weapon 10. As will be discussed in more detail below, the maximum value $N_{max}$ and a minimum value $N_{min}$ may be determined, at least in part, by the acceleration limits of the glide weapon 10. In the illustrated example of FIG. 4, this final or terminal part corresponds to the second stage 43. If the glide weapon 10 is not at a position, attitude and velocity where such proportional navigation guidance is possible, the controller 16 attempts to manoeuvre the glide weapon 10 to a position and attitude where such proportional navigation guidance is possible. Accordingly, in the switch block 53, the controller 16 determines whether, from its current position, attitude and velocity, the glide weapon 10 can achieve impact at the target 20 along the predetermined 3D impact vector 24 using the proportional navigation guidance law with a navigation gain N value between the maximum value $N_{max}$ and the minimum value $N_{min}$, or whether the impact vector 24 is at an angle requiring a value of N higher than the maximum value $N_{max}$ in order to be achieved, or whether the impact vector 24 is at an angle requiring a value of N lower than the minimum value $N_{min}$ in order to be achieved.

In FIG. 4, dotted line 45 indicates the path which the glide weapon 40 would follow if a proportional navigation guidance law with the minimum possible gain value $N_{min}$ were used starting from the initial point 40. As can be seen, this path does not achieve the desired impact vector 24, as the maximum impact angle achievable by the use of $N_{min}$ is smaller than the angle of the desired impact vector 24.

In the illustrated embodiment of FIG. 5, the controller 16 carries out the determination in the switch block 53 by calculating the two limiting impact angles in the guidance plane 32 which can be achieved by the glide weapon 10 at the target 20 using the maximum value $N_{max}$ and the minimum value $N_{min}$ of the navigation gain N respectively, together with the current flight path angle of the movement vector 22 the glide weapon 10 and the line of sight vector 30 angle to the target 20, at the current position, attitude and velocity of the glide weapon 10.

Figure 9:
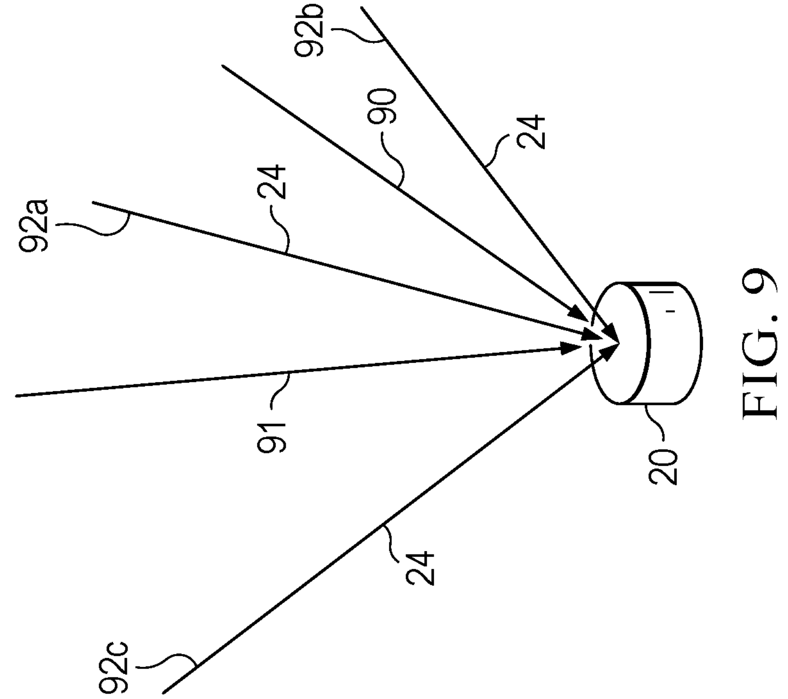
FIG. 9 shows an explanatory diagram of principles used in the guidance method of FIG. 5.

FIG. 9 is an explanatory diagram illustrating a comparison made in the switch block 53. The limiting impact angle 90 calculated using the maximum value $N_{max}$ of the navigation gain N and the limiting impact angle 91 calculated using the minimum value $N_{min}$ of the navigation gain N are compared to the angle 92 of the impact vector 24 in the guidance plane 32 to determine the relationship between the angle 92 of the impact vector 24 and the two calculated limiting impact angles 90 and 91.

If the angle 92*a* of the impact vector 24 is between the two calculated limiting impact angles 90 and 91, or equal to one of them, it is determined that the glide weapon 10 can achieve impact at the target 20 along the predetermined 3D impact vector 24 using the proportional navigation guidance law from the current position, attitude and velocity of the glide weapon 10. Alternatively, if the angle 92*b* of the impact vector 24 is outside (not between or equal to) the two calculated limiting impact angles 90 and 91 such that the limiting impact angle 90 calculated using the maximum value $N_{max}$ is located between the limiting impact angle 91 calculated using the minimum value $N_{min}$ and the impact vector 24, it is determined that the impact vector 24 cannot be achieved from the current position, attitude and velocity of the glide weapon 10 because this would require a value of navigation gain N higher than the maximum value $N_{max}$. Alternatively, if the angle of the impact vector 24 is outside the two calculated limiting impact angles 90 and 91 such that the limiting impact angle 91 calculated using the minimum value $N_{min}$ is located between the limiting impact angle 90 calculated using the maximum value $N_{max}$ and the impact vector 24, it is determined that the impact vector 24 cannot be achieved from the current position, attitude and velocity of the glide weapon 10 because this would require a value of navigation gain N lower than the minimum value $N_{min}$. However, this is not essential, and other methods of carrying out this determination may be used. Without wishing to be bound by theory, it may be preferred to carry out the determination based on comparing angles, rather than by calculating the required value of N directly, because the mathematically possible range of values of N from zero to infinity may only cover a limited range of possible impact angles, so that the impact vector 24 may be at an angle for which the equation used to determine the required value of N cannot be solved.

If it is determined in the switch block 53 that the glide weapon 10 cannot achieve impact at the target 20 along the predetermined 3D impact vector 24 by using the proportional navigation guidance law with the navigation gain N within the predetermined range, because the angle of the impact vector 24 would require a value of N lower than the minimum value $N_{min}$ in order to be achieved, the method 50 proceeds to a calculate flight path angle block 54. In the calculate flight path angle block 54, the controller 16 calculates an optimum flight path glide angle γ to maximise range of the glide weapon 10. The optimum flight path angle γ is in a vertical plane, and may be defined as an angle to the horizontal H.

Then, in a determine flight path block 55, the controller 16 uses the calculated optimum flight path angle γ and the defined guidance plane 32 to calculate a flight path 60 for the glide weapon 10, which calculated flight path 60 is at the calculated optimum flight path angle γ to the horizontal, and also lies in the guidance plane 32, with a velocity component perpendicular to the guidance plane 32 of zero. This calculated flight path 60 may be regarded as being the movement vector in the guidance plane 32 (which is usually non-vertical) which projects onto a vertical plane passing through the glide weapon 10 so that the projection 61 has the optimum flight path angle γ to the horizontal.

Figure 6:
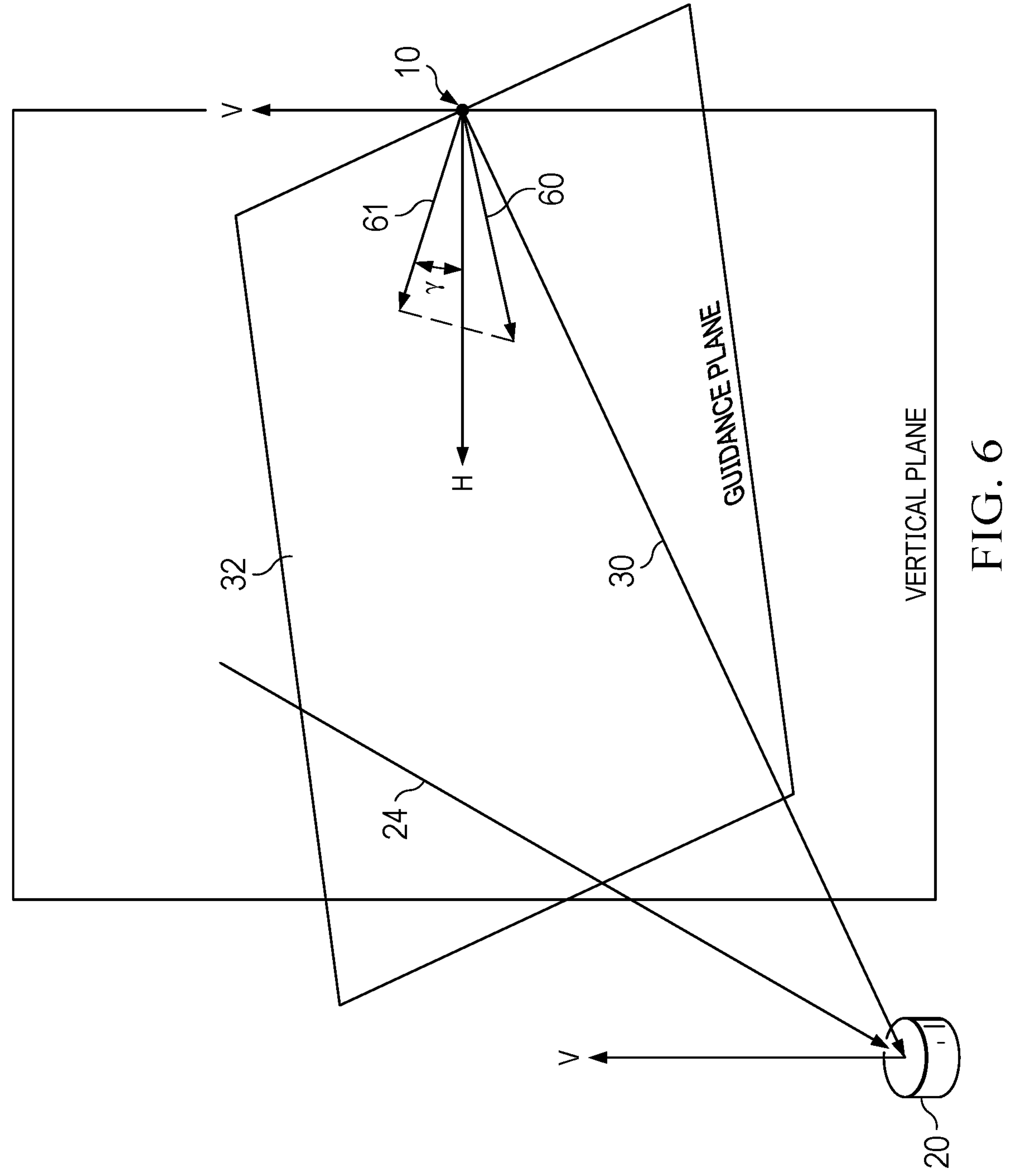
FIG. 6 is an explanatory diagram of principles used in the guidance method of FIG. 5.

FIG. 6 is an explanatory diagram showing some concepts of the guidance method 50 used in the calculate flight path angle block 54 and the determine flight path block 55.

In the illustrated embodiment, the controller 16 calculates an optimum flight path angle γ to maximise range of the glide weapon 10. The optimum flight path angle γ providing maximum gliding range for the glide weapon 10 is a flight path angle which maintains the dynamic pressure of the glide weapon 10 at an optimum value. Typically, dynamic pressure can be calculated as 0.5×air density×(air speed)$^2$. This optimum dynamic pressure value varies for different designs of glide weapon, and must be determined on a case by case basis. In the illustrated embodiment, the optimum dynamic pressure value is a predetermined value stored in the controller 16 which is fixed during flight of the glide weapon 10. This is not essential, and in other examples the optimum dynamic pressure value may vary in flight, for example if the geometry of the glide weapon 10 changes in flight. Optionally, the dynamic pressure beneath the glide weapon 10 may be measured by a pressure sensor 19. In some examples, the pressure sensor 19 may be a pitot tube.

In the illustrated embodiment, the optimum flight path angle is calculated to maintain the dynamic pressure of the glide weapon 10 at an optimum value. This is not essential, and in other examples the optimum flight path angle may alternatively, or additionally, be calculated based on any other parameter that can be adjusted to extend the range of a gliding or unpowered aerial vehicle. Maintaining an optimum flight path angle which maximises or extends the flight range of the aerial vehicle may increase the range of achievable impact angles, typically by increasing the maximum achievable impact angle.

It will be understood that the optimum flight path angle may vary during flight of the glide weapon 10, for example due to changes in altitude of the glide weapon 10, and meteorological changes in atmospheric pressure.

Then, in a control commands block 56, the controller 16 determines the necessary control commands for the control surfaces 14 of the glide weapon 10 which are required to change the current velocity vector 22 or direction of movement of the glide weapon 10 into a new velocity vector or direction lying on the calculated flight path 60, and sends the determined control commands to the control surfaces 14. It will be understood that the control commands in a vertical plane will correspond to the control commands required for the glide weapon 10 to move at the calculated optimum flight path angle γ, together with any control commands in the horizontal plane required to keep the glide weapon 10 in the guidance plane 32 (which is generally non-vertical). The method 50 then returns to the LOS block 51.

Alternatively, if it is determined in the switch block 53 that the glide weapon 10 cannot achieve impact at the target 20 along the predetermined 3D impact vector 24 by using the proportional navigation guidance law with the navigation gain N within the predetermined range, because the angle of the impact vector 24 would require a value of N higher than the maximum value $N_{max}$ in order to be achieved, the method 50 proceeds to a calculate flight path angle block 57. In the calculate flight path angle block 57, the controller 16 calculates a flight path angle which corresponds to the application of a constant downward acceleration in the guidance plane 32 to the glide weapon 10 to reduce the altitude of the glide weapon 10. The value of the constant downward acceleration is a predetermined fixed value, which may be based on the flight characteristics of the glide weapon 10 in any particular implementation.

Then, in a determine flight path block 58, the controller 16 uses the calculated flight path angle and the defined guidance plane 32 to calculate a flight path for the glide weapon 10, which calculated flight path is at the calculated flight path angle to the horizontal, and also lies in the guidance plane 32, with a velocity component perpendicular to the guidance plane 32 of zero. This calculated flight path may be regarded as being the movement vector in the guidance plane 32 (which is usually non-vertical) which projects onto a vertical plane passing through the glide weapon 10 so that the projection has the changed flight path angle to the horizontal.

Then, in a control commands block 59, the controller 16 determines the necessary control commands for the control surfaces 14 of the glide weapon 10 which are required to change the current velocity vector 22 or direction of movement of the glide weapon 10 into a new velocity vector or direction lying on the calculated flight path, and sends the determined control commands to the control surfaces 14. It will be understood that the control commands in a vertical plane will correspond to the control commands required for the glide weapon 10 to move at the calculated changed flight path angle, together with any control commands in the horizontal plane required to keep the glide weapon 10 in the guidance plane 32 (which is generally non-vertical). The method 50 then returns to the LOS block 51.

Alternatively, if it is determined in the switch block 53 that the glide weapon 10 can achieve impact at the target 20 along the predetermined 3D impact vector 24 by using the proportional navigation guidance law, the method 50 proceeds to a calculate N block 60.

In the calculate N block 60, the controller 16 calculates the value of the navigation gain $N_r$ required to be used in order for the glide weapon 10 to achieve impact at the target 20 along the predetermined 3D impact vector 24, starting from the current position, attitude and velocity of the glide weapon 10. As is explained above, the controller 16 has already determined in the switch block 53 that it is possible to do this with a value of N in the range of values of N limited by the maximum value $N_{max}$ and the minimum value $N_{min}$. The required value of the navigation gain $N_r$ can be calculated from the current flight path angle and LOS angle and the required flight path angle (the impact vector) and LOS angle at impact, as is explained in detail below.

Then, in the proportional navigation block 65, the controller 16 determines the current rate of change of the angle θ of the LOS vector 30 in the guidance plane 32 using a cross product of the current LOS vector 30 and velocity vector 22. The determined current rate of change of the LOS vector 30 is multiplied by the calculated required value $N_r$ of the navigation gain N, which was determined in the calculate N block 60, to determine a required rate of change of the angle γ of the velocity component $V_m$ parallel to the guidance plane 32 of the velocity vector 22 of the glide weapon 10.

Further, in an out of plane velocity block 66, the controller 16 determines the velocity component of the glide weapon 10 perpendicular to the guidance plane 32 of the velocity vector 22 of the glide weapon 10, and uses this to determine the amount of change in the velocity component perpendicular to the guidance plane 32 required to reduce the velocity component perpendicular to the guidance plane 32 to zero.

Then, in a calculate commands block 67, the controller 16 determines the necessary control commands for the control surfaces 14 of the glide weapon 10 which are required to change the current velocity vector 22 of the glide weapon 10 so that the angle γ of the velocity component $V_m$ parallel to the guidance plane 32 changes at the determined required rate of change, and also to change the current velocity vector perpendicular to the guidance plane 32 by the determined amount. The controller 16 then sends the determined control commands to the control surfaces 14. It will be understood that the control commands will rotate the movement vector 22 of the glide weapon 10 about an axis perpendicular to the guidance plane 32 at the determined required rate of change and reduce the velocity component of the movement vector 22 perpendicular to the guidance plane 32 to zero.

The method 50 then determines the 3D line of sight (LOS) vector 30 from the glide weapon 10 to the target 20 in a line of sight (LOS) block 68, in the same manner as is described above for the LOS black 51.

Then, in a guidance plane block 69, the controller 16 uses the determined LOS vector 30 and the stored desired impact vector 24 to define the guidance plane 32, in the same manner as is described for the guidance plane block 52.

When the guidance plane 32 has been defined, the method 50 returns to the calculate N block 60, and repeats from block 60 onwards, following an iterative guidance loop. The controller 16 continues iteratively repeating the method 50 around this iterative guidance loop until the glide weapon 10 impacts the target 20. This impact will be along the predetermined 3D impact vector 24.

In an alternative example, instead of using the LOS block 68 and the guidance plane block 69, the method 50 could return to the LOS block 51 from the calculate commands block 67. However, this alternative will unnecessarily repeat the switch block 53, which may reduce computational efficiency.

In the illustrated embodiment of FIG. 5, the required value $N_r$ of the navigation gain N calculated in the calculate N block 60 on each iteration of the iterative guidance loop formed by blocks 60 to 69. This recalculation of $N_r$ on each iteration may provide resilience against unexpected disturbances of the glide weapon 10. In alternative examples, optionally, the iterative loop may instead go directly from the guidance plane block 69 to the proportional navigation block 65, without repeating the calculate N block 60, so that the same value $N_r$ of the navigation gain N is used through all iterations of the iterative loop. This alternative approach may improve computational efficiency, although this approach may be less resilient against unexpected disturbances of the glide weapon 10.

In the illustrated embodiment of FIG. 5, the determine flight path block 58 calculates a flight path for the glide weapon 10 which lies in the guidance plane 32. This is not essential, and in some alternative examples the determine flight path block 58 may be omitted and the control commands block 59 may determine the necessary control commands required to achieve the flight path angle calculated in the flight path angle block 57. Without wishing to be bound by theory, in the situation where it is desired to reduce the altitude of the glide weapon 10 in this way, using the available energy of the glide weapon 10 efficiently may not be a concern, because if a reduction in height is required the glide weapon 10 will generally have more energy available than it requires to impact the target 20 along the desired impact vector 24.

It will be understood that the illustrated example of FIG. 4 shows the operation of the glide weapon 10 starting from an initial point 40 where the impact vector 24 is at too high an angle relative to the horizontal to be achieved, so that the controller 16 begins by iteratively following the method 50 along the leg formed by blocks 54 to 56 in the first stage 42. Subsequently, the controller 16 iteratively follows the guidance loop formed by blocks 60 to 69 in the second stage 43. It will be understood that the change from the first stage 42 to the second stage 43 occurs when the switch block 53 determines that the glide weapon 10 can achieve impact at the target 20 along the predetermined 3D impact vector 24 using the proportional navigation guidance law with a navigation gain N value between the maximum value $N_{max}$ and the minimum value $N_{min}$, and that this determination corresponds to the change over point 44 in FIG. 4.

As is discussed above, the controller 16 guides the glide weapon 10 towards the target 20 using a modified proportional navigation guidance law. Proportional navigation guidance laws are known, however, in the present disclosure the proportional navigation guidance law is modified to be carried out in the guidance plane 32, which is usually constantly moving as the LOS vector 30 between the glide weapon 10 and the target 20 changes.

A proportional navigation guidance law is a guidance law in which the rate of change of a velocity vector of a weapon is proportional to the rate of change in the line of site vector between the weapon and a target, this may be expressed as:

$$\dot{\gamma}_m = N\dot{\theta} \qquad \text{equation (1)}$$

where $\gamma_m$ is the angle of the velocity vector, θ is the angle of the line of sight vector, and N is the navigation gain or proportional constant.

An increased N will lead to a corresponding increase in the rate of change of the weapon heading, requiring higher acceleration commands to fulfil, which higher acceleration commands will reduce the line of sight rate to zero sooner.

(It will be understood that a line of sight rate of zero corresponds to the weapon heading directly in a straight line towards the target).

The value of N of the proportional guidance law used by the controller 16 of the glide weapon 10 is determined by the controller 16 within a range having predetermined maximum and minimum values $N_{min}$ and $N_{max}$. In any specific implementation the maximum and minimum values of N used should be selected to match the flight capabilities, for example one or more of dynamics, maneuverability, and acceleration limits, of the glide weapon 10. In some examples, a value of $N_{min}$ of 2 and a value of $N_{max}$ of 5 may be used, so that the value of N used is in the range 2 to 5. A value of N of 2 should theoretically provide constant acceleration throughout the flight to the target. However, in practice this can lead to the problem that if the glide weapon 10 cannot manage to achieve the necessary acceleration to follow the commanded flight profile in the early part of the flight, for example due to acceleration limits, the commanded acceleration may increase up to impact, possibly leading to large impact angle errors. Accordingly, in some examples a value of $N_{min}$ greater than 2 may be desirable to avoid the acceleration commands rapidly increasing close to the target. A higher value of N causes the commanded acceleration to start high and decrease over time, so that for a glide weapon 10 having a low acceleration limit a high maximum value of N may not be suitable.

Figure 7:
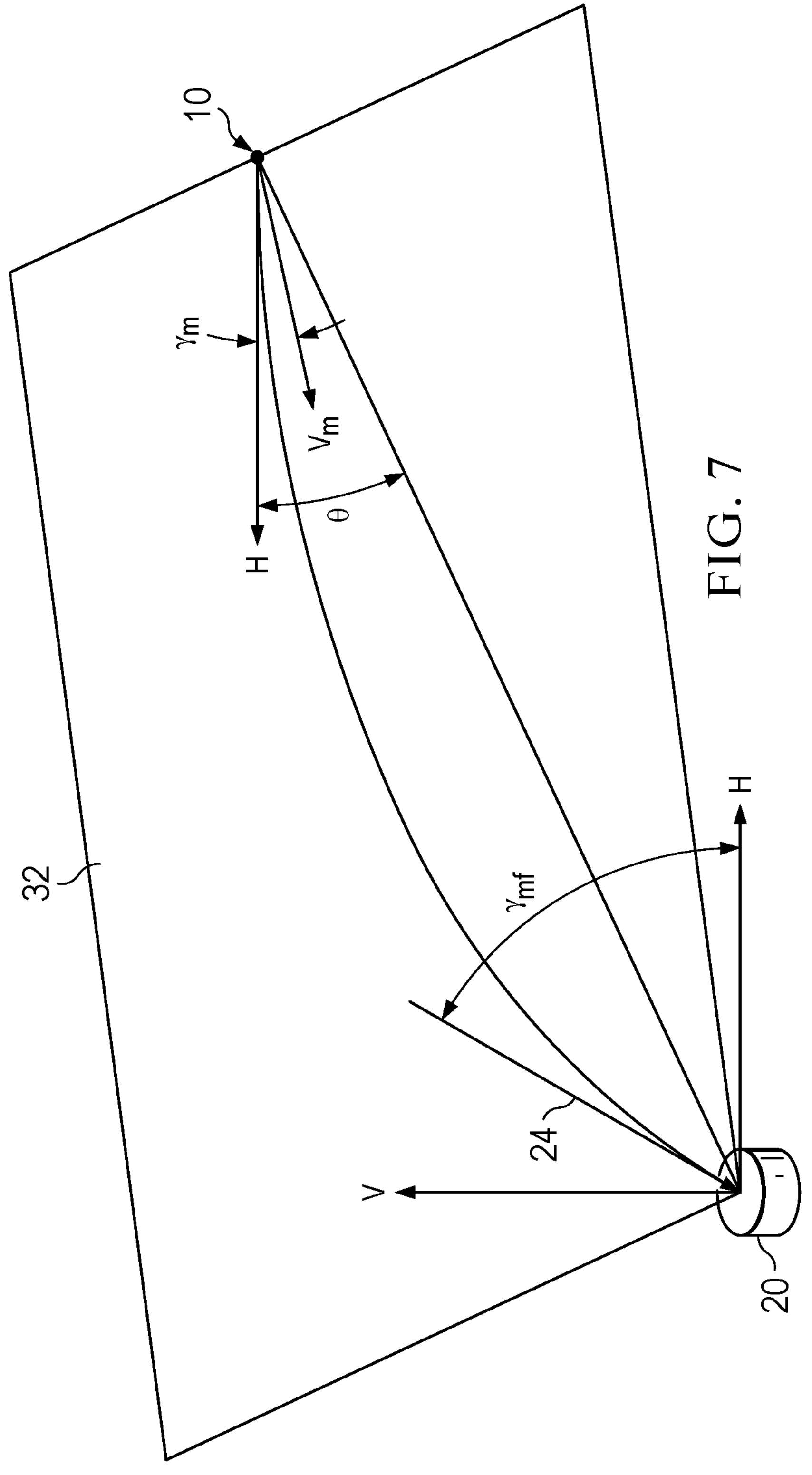
FIG. 7 is an explanatory diagram of principles used in the guidance method of FIG. 8 is a further explanatory diagram of the general operation of the glide weapon of FIG. 1.

FIG. 7 is an explanatory diagram showing some concepts of a guidance method using a proportional guidance law used in the method 50.

As shown in FIG. 7, a glide weapon 10 has a line of sight (LOS) angle θ to a target 20, the LOS angle θ being measured in the guidance plane 32 relative to the horizontal plane. Further, a desired impact vector 24 at the target 20 has an angle $\gamma_{mf}$, also measured in the guidance plane 32 relative to the horizontal plane. It will be understood that because the glide weapon 10 is an aerial weapon and the target 20 is on the ground, the angle θ is below the horizontal plane, while the angle $\gamma_{mf}$ is above the horizontal plane. In FIG. 7 the angles are shown relative to the horizontal plane for clarity. However, this is not essential, and the angles can be measured relative to any arbitrary reference, provided that both angles are measured relative to the same reference. As is explained above, the guidance plane 32 is the plane in which both the LOS 30 and the desired impact vector 24 lie, so that the LOS angle θ and the desired impact vector 24 angle $\gamma_{mf}$ will each be a single angles in the guidance plane 32. It will be understood that because the guidance plane 32 has a varying orientation relative to the horizontal plane, the values of the LOS angle θ and the desired impact vector 24 angle $\gamma_{mf}$ measured in the guidance plane 32 will vary as the orientation of the guidance plane 32 changes (although the desired impact vector 24 is fixed in the real world geographic reference frame). However, since the angles are all measured relative to the same reference these changes due to movement of the guidance plane will cancel out, leaving only the LOS angle changes due to motion of the glide weapon 10.

In FIG. 7, the glide weapon 10 is moving with a velocity component $V_m$ parallel to the guidance plane 32, at a velocity angle $\gamma_m$, measured in the guidance plane 32 relative to the horizontal. Again, measurement relative to the horizontal is not essential, provided that all of the angles are measured relative to the same reference. The velocity component $V_m$ parallel to the guidance plane 32 may be regarded as the velocity vector 22 projected into the guidance plane 32. As is explained above, the controller 16 operates to manoeuvre the glide weapon 10 to have a velocity vector 22 which lies in the guidance plane 32 with a velocity component perpendicular to the guidance plane 32 of zero. However, since the guidance plane 32 changes as the glide weapon 10 moves relative to the target 20, the glide weapon 10 may also have a non-zero velocity component perpendicular to the guidance plane 32 at some times.

Considering the proportional navigation (PN) guidance law of equation (1), by integrating the PN law over the entire flight and solving for N, the following expression is obtained:

$$\frac{\gamma_{mf} - \gamma_{m0}}{\theta_f - \theta_0} = N \quad \text{equation (2)}$$

Where $\gamma_{mf}$ is the final velocity angle at impact (the angle of the desired impact vector), $\gamma_{m0}$ is the velocity angle, $\theta_r$ is the final LOS angle at impact, and $\theta_0$ is the LOS angle.

It will be understood that in order for the glide weapon 10 to impact the target 20 at the desired impact vector, the final line of sight angle must be equal to the final velocity angle, so that:

$$\theta_f = \gamma_{mf} \quad \text{equation (3)}$$

By substituting equation (3) into equation (2), the equation for N becomes:

$$N = \frac{\gamma_{mf} - \gamma_{m0}}{\gamma_{mf} - \theta_0} \quad \text{equation (4)}$$

Accordingly, a glide weapon 10 guided using a PN law with a value of N of $N_r$ is able to strike a target 20 with a desired impact vector at an angle $\theta_0$ when the following equation is satisfied:

$$\frac{Y_{mf} - Y_{mc}}{Y_{mf} - \theta_c} = N_r \quad \text{equation (5)}$$

Where $\gamma_{mf}$ is the final velocity angle at impact (the angle of the desired impact vector), $\gamma_{mc}$ is the current velocity angle, and $\theta_c$ is the current LOS angle.

Accordingly, in the calculate N block 60, by solving equation (5) for the desired impact vector angle $\gamma_{mf}$ and the current velocity angle $\gamma_{mc}$ and LOS angle $\theta_c$ the required value $N_r$ to be used as the navigation rate N in proportional navigation in order for the glide weapon 10 to strike the target 20 with the desired impact vector from the current position, orientation and velocity of the glide weapon 10 relative to the target 20 can be determined.

In the switch block 53 of the method 50 of FIG. 5, the controller 16 solves equation (5) to calculate the final velocity angle/impact vector angle $\gamma_{mf}$ using the values of the current velocity angle $\gamma_{m0}$, current LOS angle $\theta_0$ and each of the predetermined maximum value $N_{max}$ and minimum value $N_{min}$ to calculate the two limiting impact angles in the guidance plane 32 which can be achieved by the glide weapon 10 at the target 20 using the maximum value $N_{max}$ and the minimum value $N_{min}$ of the navigation gain N respectively, as discussed above.

Figure 8:
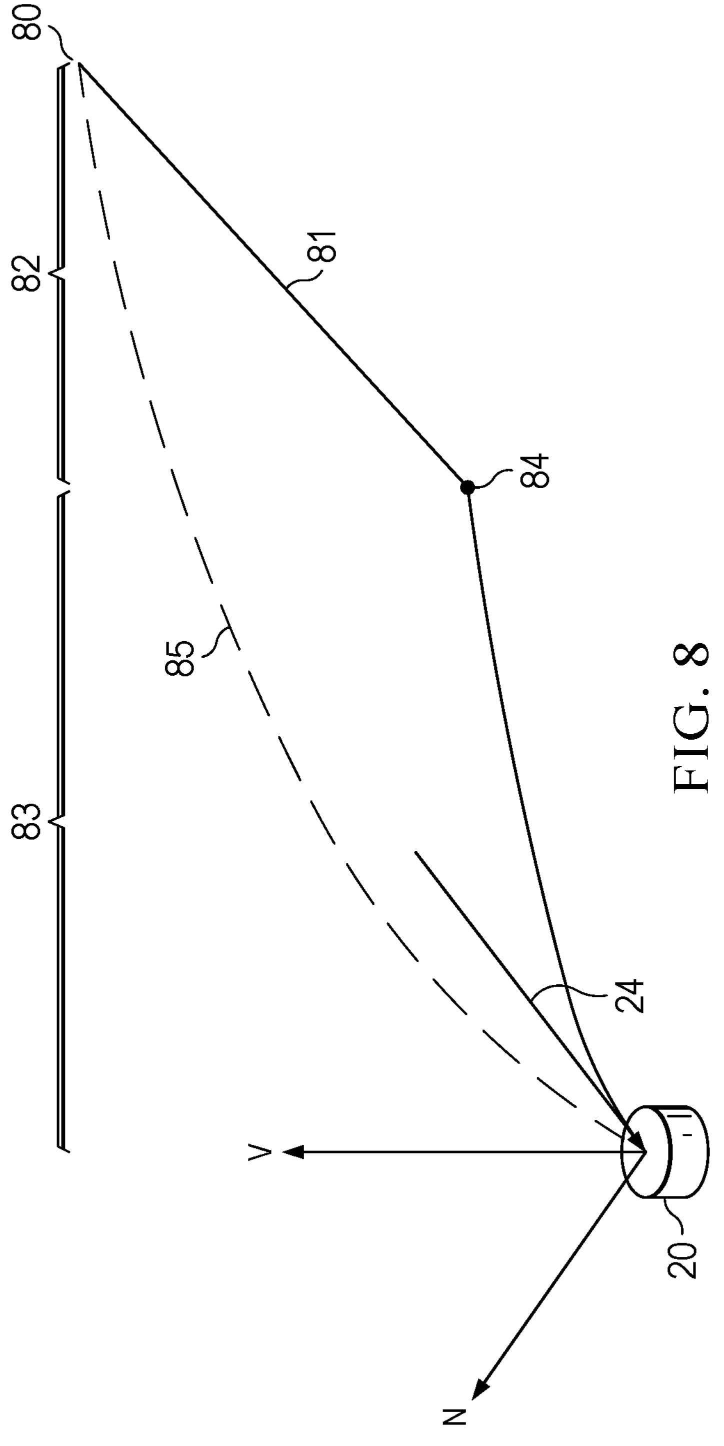

FIG. 8 shows a further explanatory diagram of the operation of the glide weapon 10 according to the first embodiment.

As shown in FIG. 8, the glide weapon 10 follows a trajectory from an initial point 80 to the target 20 along a path 81, and impacts the target 20 along the predetermined 3D impact vector 24. Similarly to initial point 40 of FIG. 4, the initial point 80 is the release point where the glide weapon 10 is dropped or released from another aerial vehicle. The controller 16 operates to guide the glide weapon 10 along the path 81 to the target 20 using a guidance process. In a first stage 82 the controller 16 guides the glide weapon 10 towards the target 20 in an altitude reducing manner which reduces the altitude of the glide weapon 10. Then, in a second, terminal, stage 83, the controller 16 guides the glide weapon 10 towards the target 20 using a proportional navigation guidance law to impact the target 20 along the predetermined 3D impact vector 24. The controller 16 controls the glide weapon 10 to manoeuvre within the guidance plane 32 as described above throughout the travel of the glide weapon 10, in both the first and second stages 82 and 83. The change over from the first stage 82 to the second stage 83, at point 84, is carried out when the controller 16 determines that it is possible for the glide weapon 10 to achieve impact at the target 20 along the predetermined 3D impact vector 24 by using the proportional navigation guidance law, as is explained above.

The illustrated example of FIG. 8 shows the operation of the glide weapon 10 starting from an initial point 80 where the impact vector 24 is at too low an angle relative to the line of sight (LOS) 30 to be achieved. Dotted line 85 indicates the path which the glide weapon 40 would follow if a proportional navigation guidance law with the maximum possible gain value $N_{max}$ were used starting from the initial point 80. As can be seen, this path does not achieve the desired impact vector 24, as the minimum impact angle achievable by the use of $N_{max}$ is larger than the angle of the desired impact vector 24. Accordingly, the controller 16 begins by iteratively following the method 50 along the leg formed by blocks 57 to 59 in the first stage 82. Subsequently, the controller 16 iteratively follows the guidance loop formed by blocks 60 to 69 in the second stage 83. It will be understood that the change from the first stage 82 to the second stage 83 occurs when the switch block 53 determines that the glide weapon 10 can achieve impact at the target 20 along the predetermined 3D impact vector 24 using the proportional navigation guidance law with a navigation gain N value between the maximum value $N_{max}$ and the minimum value $N_{min}$, and that this determination corresponds to the change over point 84 in FIG. 8.

In the event that the glide weapon starts from an initial point where the impact vector 24 can be achieved, following the switch block 53 the controller 16 will iteratively follow the guidance loop formed by blocks 60 to 69 in a similar manner to the second stages 43 and 83 of the examples of FIGS. 4 and 8.

In general, the use of a proportional navigation guidance law imposes limits on the maximum angle of the impact vector (i.e., maximum impact angle) which can be achieved for any particular starting geometry and range of values of N. This can be illustrated by considering equation (5) above. If the glide weapon 10 were to start using a proportional navigation guidance law at a position where equation (5) could not be satisfied by a value of N in the available range, it would not be possible for the glide weapon 10 to achieve impact with the target 20 at the desired impact vector angle $\gamma_{mf}$. This may commonly be the case in examples where the glide weapon 10 is released at a long range from the target 20 or at a low altitude, or where the glide weapon 10 is released at a short range from the target 20 or at a high altitude. This may also be the case where the desired impact vector 24 is at a large angle, or where the starting geometry places the desired impact vector facing away from the glide weapon 10 (which may be regarded as a desired impact vector angle of over 90°, from the point of view of the glide weapon). This problem may be overcome by using the guidance method disclosed above, because the blocks 54 to 56 or the blocks 57 to 59 can move the glide weapon 10 to a position where the proportional navigation guidance law used in the blocks 60 to 69 can achieve impact with the target 20 at the desired impact vector 24.

As is explained above, in the control commands block 56, the controller 16 determines the necessary control commands to change a current velocity vector 22 of the glide weapon 10 to a velocity vector 63 lying on the calculated flight path 60, which includes control commands required for the glide weapon 10 to move to the calculated optimum flight path angle γ. In some examples, the controller 16 can determine the necessary control commands in a vertical plane using a proportional controller.

In the embodiments described above the navigation gain N has a value within a predetermined range. In some examples, the predetermined range may have only a single value. In such examples it is possible that the method of FIG. 5 will move between the left hand arm of blocks 54 to 56 and the right hand arm of blocks 57 to 63 one or more times before being able to follow the loop of blocks 65 to 69.

In the illustrated embodiment of FIG. 5, the required value $N_r$ of the navigation gain N calculated in the switch block 53 is used in the proportional navigation block 65. In alternative examples where the switch block 53 does not calculate the required value $N_r$ of the navigation gain N, an additional calculate N block 64 may be added between the switch block 53 and the proportional navigation block 65. In this optional calculate N block 64 the controller 16 calculates the value $N_r$ of the navigation gain N which is required to be used in the proportional navigation guidance law in order for the glide weapon 10 to impact the target 20 at the impact vector 24.

In the illustrated embodiments described above, the glide weapon 10 is guided by the controller 16 using the guidance method according to the embodiment of FIG. 5. In other examples, different parts of the guidance method may be used separately.

In some examples, the method of blocks 51, 52 and 60 to 69 can be used in isolation, provided that the glide weapon is to be released at a point where the desired impact vector can be attained using the proportional guidance law approach of blocks 60 to 69. Further, in other examples, the method of blocks 60 to 69 may be used for terminal attack on a target by a glide weapon following a different guidance method being used for initial approach to the target instead of the other parts of the method of FIG. 5. Further, in other examples, the method of blocks 51 to 56 may be used by a glide weapon for initial approach to a target, and a different guidance method may be used for terminal attack on the target instead of the method of blocks 60 to 69.

In an alternative embodiment the glide weapon 10 may additionally comprise a sensor able to detect the position of the target 20 and directly measure the LOS vector 30. This measured LOS vector 30 may be used to supplement and/or verify the calculated LOS vector, to improve accuracy.

In the illustrated embodiment the controller 16 and navigation unit 18 are located on the glide weapon 10. This is not essential, in some alternative examples some, or all, of the functions of the controller and navigation unit could be located remotely from the glide weapon 10. For example, a swarm of "dumb" glide weapons could be provided with guidance commands by a master glide weapon.

In the illustrated embodiment the navigation unit 18 comprises an IMU 26 and a satellite navigation system 28. In alternative examples, the navigation unit 18 may comprise only an IMU 26, or only satellite navigation system 28.

In the illustrated embodiment the glide weapon 10 is manoeuvre using control surfaces 14. In alternative examples, the glide weapon 10 may comprise other maneuvering means in addition or alternatively to control surfaces, such a reaction jets or centre of gravity shifting mechanisms.

In the illustrated embodiment the navigation unit 18 provides periodic estimates of the position of the glide weapon 10 to the controller 16. This is not essential. In some alternative examples these estimates of position may be provided at intervals, but not necessarily periodically, for example, they may be provided on an "as available" basis.

In the illustrated embodiment the guidance of the glide weapon starts at the release point where the glide weapon is released from a carrier aerial vehicle. This is by way of example only. In other examples, the release point may be the point at which powered flight of the glide weapon ceases.

The embodiments described above are fully automatic. In some alternative examples a user or operator of the system may manually instruct some steps of the method to be carried out.

The acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously. This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is issued for designing silicon chips, or for configuring universal programmable chips, to carry out desired functions.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and high-capacity optical storage disc (BO). Further, a propagated signal is not included within the scope of computer readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fibre optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs). Complex Programmable Logic Devices (CPLDs), etc.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

Further, to the extent that the term "includes" is used in either the detailed description or the claims, such term is intended to be inclusive in a manner similar to the term "comprising" as "comprising" is interpreted when employed as a transitional word in a claim.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A method for guiding a weapon to a target, the method comprising:

obtaining, using at least one processor of an electronic device, a required impact vector for the weapon at the target;

obtaining, using the at least one processor, a line of sight (LOS) vector from the weapon to the target;

determining a velocity vector of the weapon;

defining a guidance plane, the guidance plane being a plane in which both the impact vector and the LOS vector lie;

calculating an optimum flight path angle in a vertical plane;

determining a flight path at the optimum flight path angle which lies in the guidance plane with a velocity perpendicular to a guidance plane of zero; and generating guidance commands for the weapon causing the velocity vector of the weapon to become the determined flight path.

2. The method of claim 1, wherein the optimum flight path angle maximises gliding range.

3. The method of claim 1, wherein the optimum flight path angle maintains dynamic pressure of the weapon at an optimum value.

4. The method of claim 1, further comprising:

using a proportional navigation guidance law in the guidance plane to guide the weapon to the target.

5. The method of claim 4, wherein the proportional navigation guidance law:

determines a rate of change of angle of the LOS vector; and uses the determined rate of change to determine a required rate of change of angle of a velocity component parallel to the guidance plane of the velocity vector;

and the method further comprises:

determining a velocity component perpendicular to the guidance plane of the velocity vector;

wherein the generating the guidance commands comprises generating guidance commands to change the angle of the velocity component parallel to the guidance plane of the velocity vector at the determined required rate of change and to reduce the velocity component perpendicular to the guidance plane of the velocity vector to zero.

6. The method of claim 1, wherein the method is iteratively repeated.

7. The method of claim 1, wherein the weapon is a glide weapon.

8. A weapon configured to carry out the method according to claim 1.

9. A controller coupled to a weapon configured to carry out the method according to claim 1.

10. A non-transitory computer-readable medium comprising instructions which, when executed by a computer cause the computer to carry out the method of claim 1.

11. A method for guiding a weapon to a target, the method comprising:

i) obtaining, using at least one processor of an electronic device, a required impact vector for the weapon at the target;

ii) obtaining, using the at least one processor, a line of sight (LOS) vector from the weapon to the target;

iii) determining a velocity vector of the weapon;

iv) defining a guidance plane, the guidance plane being a plane in which both the impact vector and the LOS vector lie;

v) determining whether the weapon is capable of impacting the target with the required impact vector by following a proportional navigation guidance law with a navigation gain having a value within a predetermined range having a maximum navigation gain value and a minimum navigation gain value; and if it is determined that the weapon is not capable of impacting the target with the required impact vector by following the proportional navigation guidance law with a navigation gain having a value within the predetermined range because achieving the required impact vector would require a lower navigation gain value than the minimum navigation gain value:

vi) calculating an optimum flight path angle in a vertical plane;

vii) determining a flight path at the optimum flight path angle which lies in the guidance plane with a velocity perpendicular to the guidance plane of zero; and viii) generating guidance commands for the weapon to make the velocity vector of the weapon the determined flight path; and ix) returning to i);

if it is determined that the weapon is capable of impacting the target with the required impact vector by following the proportional navigation guidance law with a navigation gain having a value within the predetermined range;

x) obtaining, using the at least one processor, a line of sight (LOS) vector from the weapon to the target;

xi) determining a velocity vector of the weapon;

xii) defining a guidance plane, the guidance plane being a plane in which both the impact vector and the LOS vector lie;

xiii) determining a navigation gain value required to impact the target with the required impact vector by following the proportional navigation guidance law in the guidance plane with that navigation gain value;

xiv) using a proportional navigation guidance law in the guidance plane to guide the weapon to the target, wherein the proportional navigation guidance law:

determines a rate of change of angle of the LOS vector; and uses the determined rate of change and the determined navigation gain value to determine a required rate of change of angle of a velocity component parallel to the guidance plane of the velocity vector; and the method further comprising:

xv) determining a velocity component perpendicular to the guidance plane of the velocity vector; and xvi) generating guidance commands to change the angle of the velocity component parallel to the guidance plane of the velocity vector at the determined required rate of change and to reduce the velocity component perpendicular to the guidance plane of the velocity vector to zero; and repeating from x) until the weapon reaches the target.

12. The method of claim 11, further comprising:

if it is determined that the weapon is not capable of impacting the target with the required impact vector by following the proportional navigation guidance law with a navigation gain having a value within the predetermined range because achieving the required impact vector would require a higher navigation gain value than the maximum navigation gain value;

xvii) calculating a flight path angle in the vertical plane which corresponds to application of a constant downward acceleration to the weapon;

xviii) determining a flight path at the flight path angle which lies in the guidance plane with a velocity perpendicular to the guidance plane of zero; and xix) generating guidance commands for the weapon to make the velocity vector of the weapon the determined flight path; and xx) returning to i).

13. The method of claim 11, further comprising:

if it is determined that the weapon is not capable of impacting the target with the required impact vector by following the proportional navigation guidance law with a navigation gain having a value within the predetermined range because achieving the required impact vector would require a higher navigation gain value than the maximum navigation gain value;

xxi) calculating a flight path angle in the vertical plane which corresponds to application of a constant downward acceleration to the weapon;

xxii) generating guidance commands for the weapon to make the velocity vector of the weapon have the determined flight path angle; and xxii) returning to i).

14. The method of claim 11, wherein the optimum flight path angle maximises gliding range.

15. The method of claim 14, wherein the optimum flight path angle maintains dynamic pressure of the weapon at an optimum value.

16. The method of claim 11, wherein the weapon is a glide weapon.

17. The method of claim 11, wherein v) comprises:

determining a first impact angle for the weapon by following a proportional navigation guidance law with the maximum navigation gain value;

determining a second impact angle for the weapon by following a proportional navigation guidance law with the minimum navigation gain value; and comparing the determined first and second impact angles to the required impact vector.

18. The method of claim 17, wherein it is determined that the weapon is capable of impacting the target with the required impact vector by following the proportional navigation guidance law with a navigation gain having a value within the predetermined range if the required impact vector is between or equal to the first and second impact angles.

19. The method of claim 17, wherein it is determined that the weapon is not capable of impacting the target with the required impact vector by following the proportional navigation guidance law with a navigation gain having a value within the predetermined range because achieving the required impact vector would require a higher navigation gain value than the maximum navigation gain value if the impact vector is outside the first and second impact angles, and the first impact angle is located between the second impact angle and the impact vector.

20. The method of claim 17, wherein it is determined that the weapon is not capable of impacting the target with the required impact vector by following the proportional navigation guidance law with a navigation gain having a value within the predetermined range because achieving the required impact vector would require a lower navigation gain value than the maximum navigation gain value if the impact vector is outside the first and second impact angles, and the second impact angle is located between the first impact angle and the impact vector.

* * * * *